United States Patent
Winter

(10) Patent No.: US 8,415,042 B2
(45) Date of Patent: *Apr. 9, 2013

(54) METAL HALOGEN ELECTROCHEMICAL CELL SYSTEM

(75) Inventor: Rick Winter, Orinda, CA (US)

(73) Assignee: Primus Power Corporation, Hayward, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/226,573

(22) Filed: Sep. 7, 2011

(65) Prior Publication Data

US 2011/0318619 A1 Dec. 29, 2011

Related U.S. Application Data

(63) Continuation of application No. 12/523,146, filed as application No. PCT/US2008/051111 on Jan. 16, 2008, now Pat. No. 8,039,161, which is a continuation of application No. 11/654,380, filed on Jan. 16, 2007, now abandoned.

(51) Int. Cl.
*H01M 2/36* (2006.01)

(52) U.S. Cl. .......... 429/72; 429/452; 429/454; 429/455; 429/456; 429/457; 429/471

(58) Field of Classification Search .......... 429/72, 429/452, 454, 455, 456, 457, 471
See application file for complete search history.

(56) References Cited

U.S. PATENT DOCUMENTS

| | | |
|---|---|---|
| 3,540,934 A | 11/1970 | Boeke |
| 3,644,190 A | 2/1972 | Weist et al. |
| 3,713,888 A | 1/1973 | Symons |
| 3,773,561 A | 11/1973 | Bjorkman |
| 3,813,301 A | 5/1974 | Carr |
| 3,909,298 A | 9/1975 | Carr |
| 3,935,024 A | 1/1976 | Symons |
| 3,940,283 A | 2/1976 | Symons |
| 3,954,502 A | 5/1976 | Symons et al. |
| 3,993,502 A | 11/1976 | Bjorkman, Jr. |
| 4,001,036 A | 1/1977 | Berman et al. |
| 4,020,238 A | 4/1977 | Symons |
| 4,025,697 A | 5/1977 | Hart |
| 4,068,043 A | 1/1978 | Carr |
| 4,071,660 A | 1/1978 | Hart |
| 4,072,540 A | 2/1978 | Symons et al. |
| 4,086,393 A | 4/1978 | Hart |
| 4,100,332 A | 7/1978 | Carr |
| 4,115,529 A | 9/1978 | Behling |
| 4,127,701 A | 11/1978 | Symons et al. |
| 4,146,680 A | 3/1979 | Carr et al. |
| 4,162,351 A | 7/1979 | Putt et al. |
| 4,200,684 A | 4/1980 | Bro |
| 4,257,867 A | 3/1981 | Hammond et al. |
| 4,273,839 A | 6/1981 | Carr et al. |
| 4,287,267 A | 9/1981 | Whittlesey et al. |
| 4,306,003 A | 12/1981 | Henriksen |
| 4,307,159 A | 12/1981 | Hammond et al. |
| 4,320,179 A | 3/1982 | Hart |
| 4,371,825 A | 2/1983 | Chi et al. |
| 4,402,808 A * | 9/1983 | McMonigle ............ 204/247 |
| 4,413,042 A | 11/1983 | Carr |
| 4,414,292 A | 11/1983 | Kiwalle et al. |
| 4,415,847 A | 11/1983 | Galloway |
| 4,518,663 A | 5/1985 | Kodall et al. |
| 4,518,664 A | 5/1985 | Whittlesey et al. |
| 4,534,833 A | 8/1985 | Carr et al. |
| 4,567,120 A | 1/1986 | Jorne et al. |
| 4,678,656 A | 7/1987 | Bjorkman, Jr. et al. |
| 4,728,587 A | 3/1988 | Horie et al. |
| 4,746,585 A | 5/1988 | Stoner et al. |
| 4,784,924 A | 11/1988 | Savinell et al. |
| 2004/0234843 A1 | 11/2004 | Skyllas-Kazacos |
| 2005/0181273 A1 | 8/2005 | Deguchi et al. |
| 2005/0244707 A1 | 11/2005 | Skyllas-Kazacos |
| 2009/0239131 A1 | 9/2009 | Winter |
| 2010/0021805 A1 | 1/2010 | Winter |

FOREIGN PATENT DOCUMENTS

| | | |
|---|---|---|
| JP | 60037681 A | 2/1985 |
| JP | 62296374 A | 12/1987 |
| JP | 63-314782 A | 12/1988 |
| JP | 02-010671 A | 1/1990 |
| JP | 07240218 A | 9/1995 |
| JP | 2003504811 A | 2/2003 |
| WO | WO 2008/089205 A2 | 7/2008 |

OTHER PUBLICATIONS

Office Action, U.S. Appl. No. 12/458,853, Aug. 2, 2011, USPTO, 15 pgs.
U.S. Appl. No. 12/656,664, filed Feb. 12, 2010, Winter, Rick.
Symons, Philip C., "Advanced Technology Zinc/Chlorine Batteries for Electric Utility Load Leveling," 19th Intersociety Energy Conversion Engineering Conf., 1984, vol. 2, 857-862.
International Search Report mailed Jul. 8, 2008, in PCT/US2008/051111 (WO 2008/089205), 2 pages.
EPRI Report, EM-1051 (parts 1-3), Apr. 1979, Electric Power Research Institute.
International Search Report and Written Opinion mailed Feb. 28, 2011, received in International Application No. PCT/US2010/042774.
Office Action issued in Japanese Application No. 2009-545732, mailed on Dec. 25, 2012.

* cited by examiner

*Primary Examiner* — Patrick Ryan
*Assistant Examiner* — Ladan Mohaddes
(74) *Attorney, Agent, or Firm* — The Marbury Law Group PLLC

(57) ABSTRACT

A metal halogen electrochemical energy cell system that generates an electrical potential. One embodiment of the system includes at least one cell including at least one positive electrode and at least one negative electrode, at least one electrolyte, a mixing venturi that mixes the electrolyte with a halogen reactant, and a circulation pump that conveys the electrolyte mixed with the halogen reactant through the positive electrode and across the metal electrode. Preferably, the positive electrode comprises porous carbonaceous material, the negative electrode comprises zinc, the metal comprises zinc, the halogen comprises chlorine, the electrolyte comprises an aqueous zinc-chloride electrolyte, and the halogen reactant comprises a chlorine reactant. Also, variations of the system and a method of operation for the systems.

19 Claims, 3 Drawing Sheets

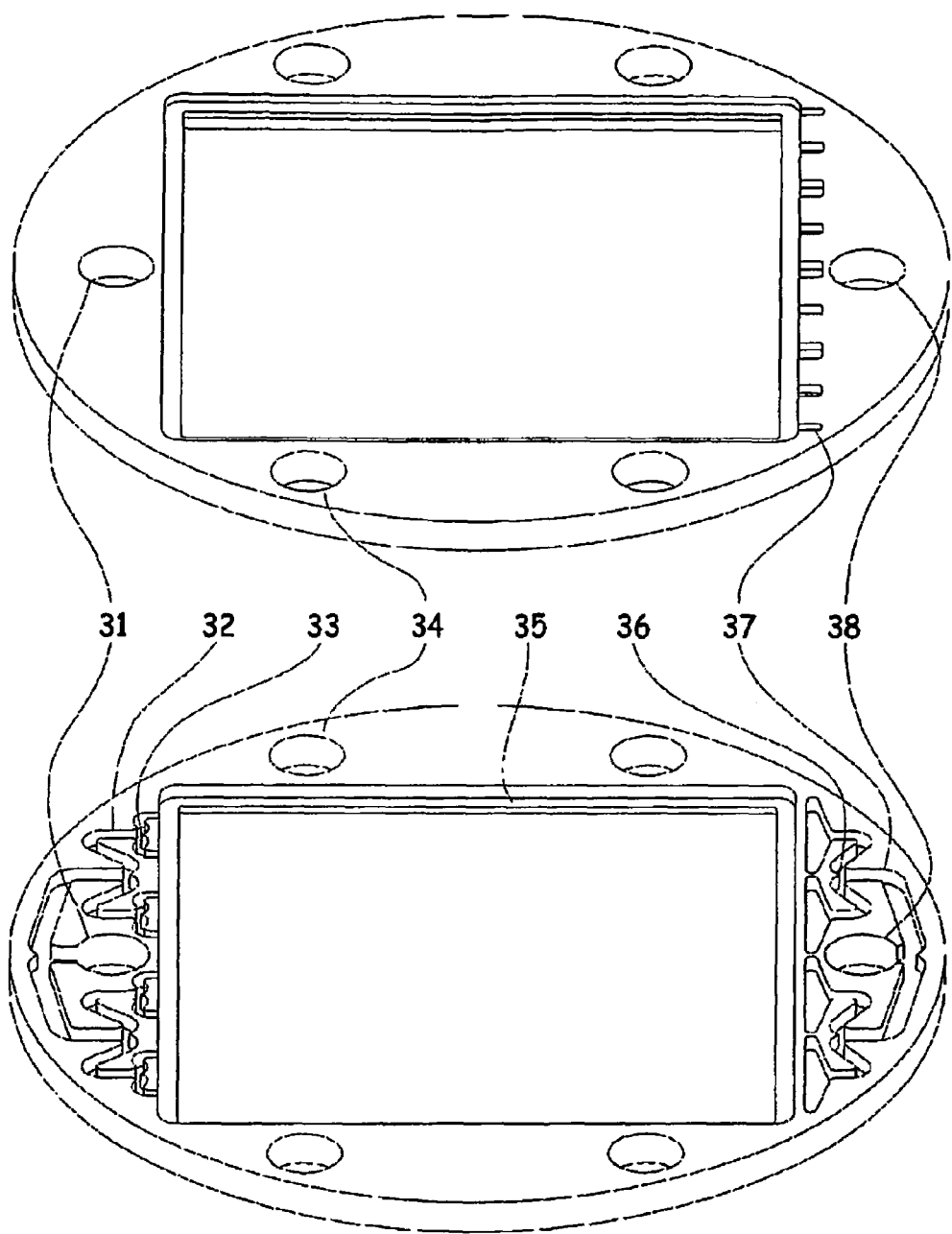

METAL HALOGEN ELECTROCHEMICAL CELL SYSTEM

The present application is a continuation of U.S. application Ser. No. 12/523,146, filed Jul. 14, 2009, which is a National Stage of PCT/US2008/051111, filed Jan. 16, 2008, which is a continuation of U.S. application Ser. No. 11/654,380, filed Jan. 16, 2007, now abandoned, which are incorporated herein by reference in their entireties.

BACKGROUND OF THE INVENTION

1. Field of the Invention

The present invention relates to metal halogen electrochemical energy systems.

2. Related Art

One type of electrochemical energy system uses a halogen component for reduction at a normally positive electrode, and an oxidizable metal adapted to become oxidized at a normally negative electrode during the normal dispatch of the electrochemical system. An aqueous electrolyte is used to replenish the supply of halogen component as it becomes reduced at the positive electrode. The electrolyte contains the dissolved ions of the oxidized metal and reduced halogen and is circulated between the electrode area and a reservoir area and an elemental halogen injection and mixing area, to be consumed at the positive electrode. One example of such a system uses zinc and chlorine system.

Such electrochemical energy systems are described in prior patents including U.S. Pat. Nos. 3,713,888, 3,993,502, 4,001,036, 4,072,540, 4,146,680, and 4,414,292. Such systems are also described in EPRI Report EM-1051 (Parts 1-3) dated April 1979, published by the Electric Power Research Institute. The specific teachings of the aforementioned cited references are incorporated herein by reference.

SUMMARY OF THE INVENTION

There are certain weaknesses or disadvantages in prior electrochemical energy systems for standby applications. These include, but are not limited to, the following:

An inability to store sufficient energy without requirement to charge the system, precluding availability while in a discharged condition;

Complexity and inefficiency of requiring active cooling systems during discharge, which can further reduce capacity;

Ambiguities in diagnosing symptoms of failure, which can significantly increase a probability of failure; and Hydrogen generation, which can be a significant and costly safety issue.

Specific weaknesses or disadvantages in prior metal halogen systems for standby applications also include, but are not limited to, the following:

Inability to maintain a state of readiness without significant capacity loss due to self-discharge;

Mal-distribution of zinc metal from internal shunt currents between cells of differing potential further reduces available capacity;

A long length of small diameter channels required for minimizing shunt currents during operation further reduce system capacity due to pumping losses;

Metallic dendritic growth during the charge mode can permanently damage a metal halogen system and lead to premature and hazardous failure conditions.

The invention attempts to address some or all of these weaknesses and disadvantages. The invention is not limited to embodiments that do, in fact, address these weaknesses and disadvantages.

Some embodiments of the invention that attempts to address some or all of these weaknesses and disadvantages are metal halogen electrochemical energy cell systems. These embodiments preferably include at least at least one positive and at least one negative electrode, a reaction zone between the positive electrode and the negative electrode, at least one electrolyte that includes a metal and a halogen, and a circulation pump that conveys the electrolyte through the reaction zone, wherein the electrolyte and a halogen reactant are mixed before, at, or after the pump. Preferably, the positive electrode is made of porous carbonaceous material, the negative electrode is made of zinc, the metal include zinc, the halogen includes chlorine, the electrolyte includes an aqueous zinc-chloride electrolyte, and the halogen reactant includes a chlorine reactant. One effect of this arrangement is generation of an electrical potential.

A preferred embodiment further includes a mixing venture that mixes the electrolyte and the halogen reactant, as well as a metering valve or positive displacement pump that controls flow of the halogen reactant to the mixing venturi.

A flow of the electrolyte preferably undergoes concurrent first, second, and third order binary splits before being conveyed through the reaction zone, thereby providing a same flow resistance for different paths to the reaction zone.

Preferred embodiments of the systems also include a reservoir from which the electrolyte is conveyed by the circulation pump to the cell and to which the electrolyte returns from the cell, an upward-flowing electrolyte return manifold to facilitate purging of gas from the cell, and a return pipe through which the electrolyte returns from the cell to the reservoir.

The halogen reactant preferably is supplied from an external source and preferably is supplied under pressure. In this context, "external" refers to external to the system. An enthalpy of expansion of the halogen from the external source tends to act to cool the system. Alternatively, the halogen reactant can be supplied from a source internal to the system.

The systems preferably include plural such cells, each of which is horizontal and plural of which are stacked vertically in the system. Vertical steps in cell geometry tend to result in interrupted electrolyte flow paths within each of the plural cells, thereby interrupting shunt currents that otherwise would continue to occur after electrolyte flow stops.

The plural cells preferably include plural cell frames. The cell frames can be circular to facilitate insertion of the plural cells into a pressure containment vessel. The preferred form of the cell frames each include a feed manifold element, distribution channels, flow splitting nodes, spacer ledges, flow merging nodes, collection channels, and a return manifold element. When cell frames having this form are stacked, these structures form additional structures within the system. In particular:

The feed manifold element in each of the plural cells frames aligns with the feed manifold element in another of the cell frames, thereby forming a feed manifold;

The distribution channels and the flow splitting nodes in each of the cell frames align with the distribution channels and the flow splitting nodes in another of the cell frames, thereby forming a distribution zone;

The positive electrode for each cell sits above or below the negative electrode for each cell on the spaces ledges of the cell frames, thereby forming alternating layers of positive electrodes and negative electrodes;

The flow merging nodes and the collection channels in each of the plural cells frames align with the flow merging nodes and the collection channels in another of the cell frames, thereby forming a collection zone; and The return manifold element in each of the cell frames aligns with the return manifold element in another of the cell frames, thereby forming a return manifold.

The cell frames can include bypass conduit elements for fluid flow and electrical wires or cables and preferably provide a pass-through for a alignment and clamping element to align and to hold the cell frames together.

The invention is not limited to systems with cells that include cell frames.

Whether or not cell frames are used, preferred embodiments of the systems include a feed manifold and a distribution zone for the electrolyte to the plural cells, and a collection zone and a return manifold for the electrolyte from the plural cells. The positive electrode and the negative electrode in each cell preferably are arranged to maintain contact with a pool of electrolyte in each cell when electrolyte flow stops and the feed manifold, distribution zone, collection zone, and return manifold drain.

In some embodiments, a balancing voltage can be applied to inhibit electrochemical reactions and thereby maintain system availability when the system is in a standby or stasis mode. A blocking diode also can be applied to output terminals of the system to inhibit reverse current flow within the system.

The basic operation of preferred embodiment of the system is as follows: aqueous electrolyte is sucked up from a reservoir and through a mixing venturi where halogen such as elemental chlorine is metered into an electrolyte. The halogen mixes with and dissolves into the electrolyte while its latent heat of liquefaction also cools the mixture. The cooled and halogenated aqueous electrolyte passes through the pump and is delivered to positive electrodes in a stack assembly. The positive electrodes preferably are made of porous carbonaceous material such as porous graphite-chlorine. The electrolyte passes through the positive electrodes, reducing the dissolved halogen. The halogen-ion rich electrolyte then passes by one or more a negative electrode preferably made of a metal such as zinc, where electrode dissolution occurs. These reactions yield power from the electrode stack terminals and metal-halogen is formed in the electrolyte by reaction of the metal and the halogen.

The invention also encompasses processes performed by embodiments of the metal halogen electrochemical energy cell system according to the invention, as well as other systems and processes.

This brief summary has been provided so that the nature of the invention may be understood quickly. Other objects, features, and advantages of the invention will become apparent from the description herein, from the drawings, which show a preferred embodiment, and from the appended claims.

BRIEF DESCRIPTION OF THE FIGURES

FIG. 3 illustrates cell frames that can be used in the system illustrated in FIGS. 1 and 2.

DETAILED DESCRIPTION OF THE INVENTION

Electrolyte Energy Cell System

Figure 1:
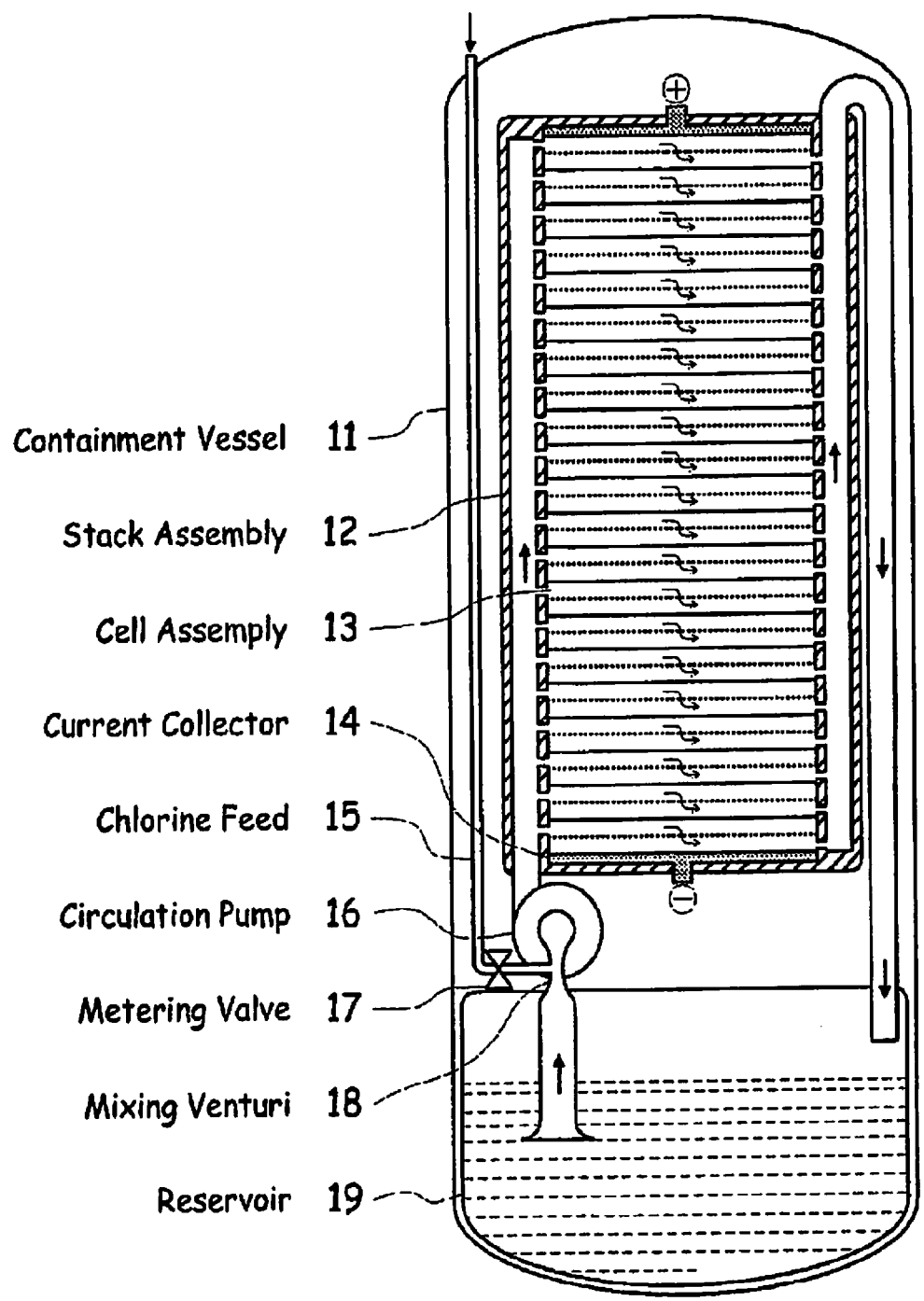
FIG. 1 illustrates a metal halogen electrochemical energy cell system according to the invention.

FIG. 1 illustrates a metal halogen electrochemical energy cell system according to the invention.

One embodiment of the invention that attempts to address some or all of these weaknesses and disadvantages is a metal halogen electrochemical energy cell system. This embodiment includes at least at least one positive and at least one negative electrode, a reaction zone between the positive electrode and the negative electrode, at least one electrolyte that includes a metal and a halogen, and a circulation pump that conveys the electrolyte through the reaction zone. The electrolyte and a halogen reactant can be mixed before, at, or after the pump, for example using a mixing venture. Preferably, the positive electrode is made of porous carbonaceous material, the negative electrode is made of zinc, the metal include zinc, the halogen includes chlorine, the electrolyte includes an aqueous zinc-chloride electrolyte, and the halogen reactant includes a chlorine reactant. One effect of this arrangement is generation of an electrical potential.

The basic operation of this embodiment is as follows: aqueous electrolyte is sucked up from a reservoir and through a mixing venturi where halogen such as elemental chlorine is metered into an electrolyte. The halogen mixes with and dissolves into the electrolyte while its latent heat of liquefaction also cools the mixture. The cooled and halogenated aqueous electrolyte passes through the pump and is delivered to positive electrodes in a stack assembly. The positive electrodes preferably are made of porous carbonaceous material such as porous graphite-chlorine. The electrolyte passes through the positive electrodes, reducing the dissolved halogen. The halogen-ion rich electrolyte then passes by one or more a negative electrode preferably made of a metal such as zinc, where electrode dissolution occurs. These reactions yield power from the electrode stack terminals and metal-halogen is formed in the electrolyte by reaction of the metal and the halogen.

FIG. 1 shows an electrochemical energy system housed in containment vessel 11 designed to achieve the foregoing. The system in FIG. 2 includes two basic parts: stack assembly 12 and reservoir 19, as shown in FIG. 1.

Stack assembly 12 is made up of a plurality of cells or cell assemblies 13 that include at least one porous electrode and at least one metal electrode. The cells preferably are stacked vertically. Pressurized halogen reactant is supplied via feed pipe 15 from a source external to the system through metering valve 17 to mixing venturi 18. Circulation pump 16 circulates the electrolyte from reservoir 19 through mixing venturi 18, through stack assembly 12, and back to reservoir 19 through a return pipe. It should be noted that some halogen reactant could be left in the electrolyte when it returns back to the reservoir from the cell.

In a preferred embodiment, the porous electrodes include carbonaceous material, the metal includes zinc, the metal electrode includes zinc, the halogen includes chlorine, the electrolyte includes an aqueous zinc-chloride electrolyte, and the halogen reactant includes a chlorine reactant.

In a preferred embodiment, this arrangement results in cells that each has an electrical potential of two volts, giving a stack arrangement with 21 cells a potential of 42 volts. An enthalpy of expansion of the halogen from the external source preferably cools the system. Thus, a strong potential can be provided without generating excessive heat.

Electrolyte Flows

Figure 2:
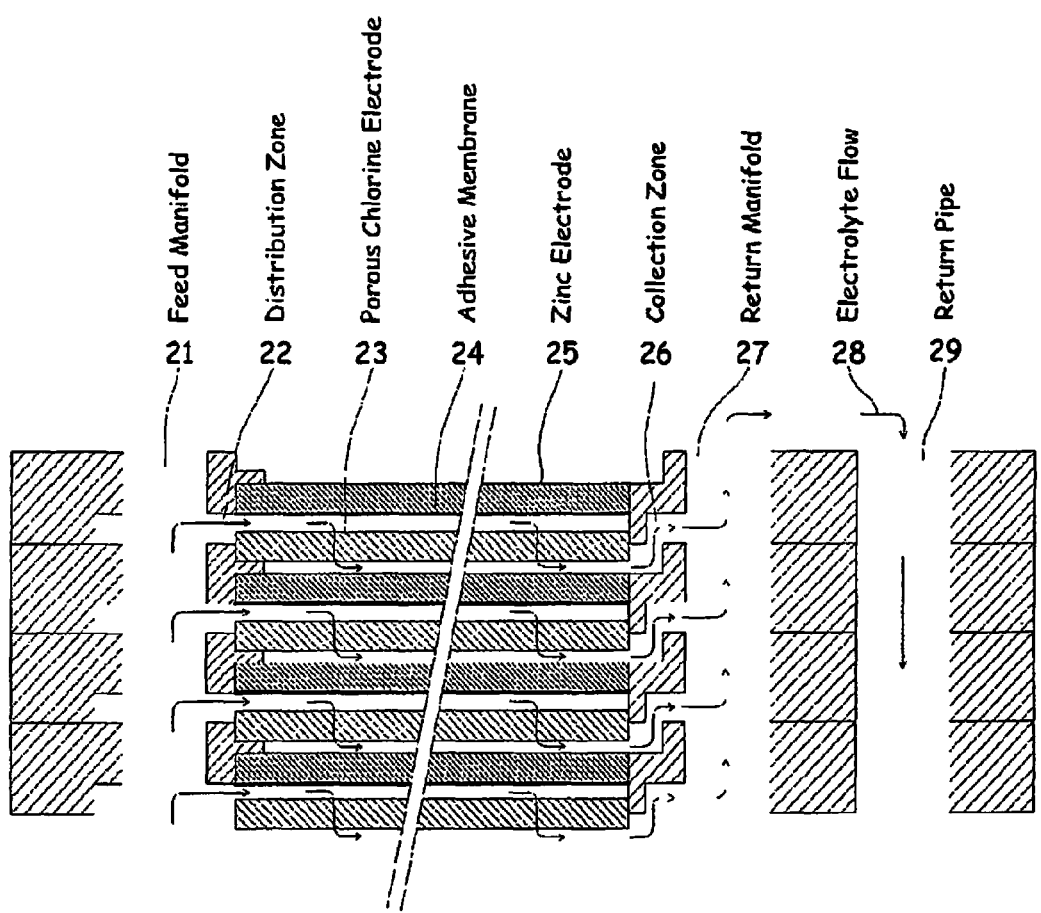
FIG. 2 illustrates flow paths of an electrolyte through the cell plates of an embodiment of the system illustrated in FIG. 1.

FIG. 2 illustrates flow paths of an electrolyte through the cell plates of an embodiment of the system illustrated in FIG. 1. In this figure, the electrolyte flow paths 28 are represented by arrows. These paths are from feed manifold 21, to distribution zone 22, through porous electrodes 23, over metal electrodes 25, to collection zone 26, through return manifold 27, and to return pipe 29.

In a preferred embodiment, membranes 24 on a bottom of metal electrodes 25 screen the flows of electrolyte from contacting the metal electrodes before passing through the porous electrodes. These membranes preferably are plastic membranes secured to bottoms of the metal electrodes with adhesive. Other types of membranes secured in other ways also can be used. Alternatively, the membranes could be omitted.

With the arrangement shown in FIG. 2, the porous electrode and the metal electrode in each cell are arranged to maintain contact with a pool of electrolyte in each cell when electrolyte flow stops and the feed manifold, distribution zone, collection zone, and return manifold drain.

Furthermore, the vertically stacked cells and the geometry of the cells result in flow paths of the electrolyte within each of the plural cells that tend to interrupt shunt currents that otherwise would occur when electrolyte flow stops. These shunt currents are not desired because they can lead to reactions between the plates that corrode the metal plates without generating any usable potential.

Before being conveyed through the porous electrode, the electrolyte mixed with the halogen reactant preferably undergoes first, second, and third order splits to provide a same flow resistance for different paths to the porous electrode. Each split preferably divides the flow by two, although this need not be the case. FIG. 3 illustrates one possible cell design that can achieve these splits.

Cell Frames

FIG. 3 illustrates a cell design that uses cell frames to achieve the structures and flows shown in FIG. 2. These cell frames preferably include feed manifold element 31, distribution channels 32, flow splitting nodes 33, spacer ledge 35, flow merging nodes 36, collection channels 37, return manifold element 38, and bypass conduit elements 34.

When these cell frames are stacked vertically with the electrodes in place, these elements combine to form the elements shown in FIG. 2 as follows:

The feed manifold element in each of the plural cells frames aligns with the feed manifold element in another of the cell frames, thereby forming a feed manifold;

The distribution channels and the flow splitting nodes in each of the cell frames align with the distribution channels and the flow splitting nodes in another of the cell frames, thereby forming a distribution zone;

The porous electrode for each cell sits above or below the metal electrode for each cell on the spaces ledges of the cell frames, thereby forming alternating layers of porous electrodes and metal electrodes;

The flow merging nodes and the collection channels in each of the plural cells frames align with the flow merging nodes and the collection channels in another of the cell frames, thereby forming a collection zone;

The return manifold element in each of the cell frames aligns with the return manifold element in another of the cell frames, thereby forming a return manifold; and The bypass conduit elements in each of the cell frames align with the bypass conduit elements in another of the cell frames, thereby forming bypass conduits for fluid flow and/or electrical wires or cables.

The cell frames preferably are circular to facilitate insertion of the plural cells into a pressure containment vessel such as vessel 11.

The cell frame based design facilitates low-loss electrolyte flow with uniform distribution, bipolar electrical design, ease of manufacture, internal bypass paths, and elements by which the operational stasis mode (described below) can be achieved. Innovations of the cell frame include, but are not limited to, the flow-splitting design in the distribution zone that include first, second, and third order splits in the flow channels to deliver eight feed channels per cell to the reaction zone. This design attempts to ensure that each outlet to the reaction zone passes through the same length of channels, the same number and radius of bends, with laminar flow throughout and uniform laminar flow prior to each split. The design encourages division of flow volume equally, independent of flow velocity, uniformity of viscosity, or uniformity of density in the electrolyte. These features have been found to be of particular importance when a mixture of gaseous and liquid phases is fed through the system.

Alternatively, the same types of structures and flows (i.e., those shown in FIG. 2) can be achieved without using cell frames.

Modes of Operation

The energy cell system according to the invention preferably Cell has three modes of operation: Off Mode, Power Mode, and Stasis Mode. These modes are described below in the context of a zinc-chlorine system. However, the modes also can be implemented using other metal-halogen systems.

Off Mode is typically used for storage or transportation. During Off Mode, the circulation pump is off. A small amount of elemental chlorine in the stack assembly is reduced and combined with zinc ions to form zinc-chloride. The stack terminals preferably are connected via a shorting resistor, yielding a stack potential of zero volts. A blocking diode preferably is used to prevent reverse current flow through the system via any external voltage sources.

During Power Mode the electrolyte circulation pump is engaged. The catholyte (i.e., electrolyte) containing dissolved chlorine is circulated through the stack assembly containing the zinc anode plates. Electrons are released as zinc ions are formed and captured as chlorine ions are formed, preferably with an electrical potential of 2.02 volts per cell, thereby creating electrical power from the terminals of the collector plates preferably located at each end of the stack assembly. The demand for power from the system consumes chlorine and reduces pressure within the reservoir, causing the metering valve to release higher-pressure chlorine into the mixing venturi. This design feature aids both in speeding the dissolving of chlorine gas into the electrolyte, and uniformly cooling the electrolyte without risk of freezing at the injection point. The injection rate preferably is determined by the electrochemical reaction rates within the stack assembly. The metering valve and the circulation pump preferably provide sufficient response speed to match rapidly changing instantaneous power demands. As the compressed chlorine is released into the system, its enthalpy of expansion should absorb sufficient heat to maintain the energy cell within thermal operating limits.

During Stasis or Standby Mode, there should be little or no electrolyte flow or chlorine injection. The availability of the system preferably is maintained via a balancing voltage that is applied to maintain system availability. This balancing voltage tends to prevent self-discharge by maintaining a precise electrical potential on the cell stack to counteract the electrochemical reaction forces that can arise with the circulation pump off. The particular design of the cell plates tends to interrupt shunt currents that would otherwise flow through the feed and return manifolds, while maintaining cell-to-cell electrical continuity through the bipolar electrode plates.

While these are preferred modes of operation, the invention is not limited to these modes or to the details of these modes. Rather, some embodiments might have some of these modes, none of these modes, or different modes of operation.

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

The invention claimed is:

1. A metal halogen electrochemical system, comprising:
   (A) a vessel that contains:
      (a) a stack of cells, wherein each cell comprises:
         at least one positive electrode;
         at least one negative electrode; and
         a reaction zone between the positive electrode and the negative electrode; and
      (b) an electrolyte comprising a metal and a halogen;
      (c) a stack of cell frames supporting the stack of cells;
      (d) a feed manifold opening and a return manifold opening in each cell frame in the stack of cell frames;
      (e) a feed manifold formed by aligned feed manifold openings in the stack of cell frames;
      (f) a return manifold formed by aligned return manifold openings in the stack of cell frames;
      (g) a plurality of distribution channels located in each cell frame, wherein the distribution channels are configured to introduce the electrolyte from the feed manifold to the reaction zone of each cell, and from the reaction zone to the return manifold; and
   (B) a circulation pump that is configured to convey a flow of the electrolyte through the reaction zone of each of the cells of the stack.

2. The system of claim 1, wherein the positive electrode comprises a porous carbonaceous material, the halogen comprises chlorine, and the electrolyte comprises an aqueous zinc chloride electrolyte.

3. The system of claim 1, wherein the negative electrode comprises zinc and the metal comprises zinc.

4. The system of claim 1, wherein the vessel contains an electrolyte storage reservoir below the stack of cells, and the circulation pump is configured to convey the flow of the electrolyte from the reservoir to the stack of cells through the feed manifold.

5. The system of claim 1, wherein said distribution channels are formed by splitting nodes, each splitting the flow of the electrolyte into two, so that each of said distribution channels has the same length and the same number and radius of bends.

6. The system of claim 1, wherein the return manifold comprises an upward flowing return manifold configured to collect the electrolyte from the cells of the stack; and the stack maintains a cell-to-cell electrical continuity and does not maintain a cell-to-cell electrolyte continuity when the flow of the electrolyte stops.

7. The system of claim 1, wherein each cell frame comprises a spacer ledge which supports an electrode of a cell in the stack of cells.

8. The system of claim 1, wherein the positive electrode and the negative electrode are arranged to maintain contact with a pool of the electrolyte when the flow of the electrolyte stops.

9. The system of claim 1, wherein the electrolyte comprises an electrolyte mixture containing (i) at least one aqueous electrolyte comprising the metal and the halogen and (ii) a halogen reactant.

10. The system of claim 9, wherein the circulation pump is located in the vessel, and the halogen reactant is supplied from a source internal to the system.

11. The system of claim 9, wherein an inlet of the electrolyte mixture to the reaction zone and an outlet of the electrolyte mixture from the reaction zone are each located at or above the bottom of the positive electrode within the reaction zone.

12. The system of claim 1, wherein the stack of cells comprises a vertical stack of horizontally positioned cells.

13. A metal halogen battery, comprising:
   (A) a vessel that contains:
      (a) a vertical stack of a plurality of horizontal cells, each of the plurality of horizontal cells comprising:
         at least one positive electrode;
         at least one negative electrode; and
         a reaction zone between the positive electrode and the negative electrode; and
      (b) an electrolyte comprising a metal and a halogen; and
   (B) a circulation pump that is configured to convey a flow of the electrolyte through the reaction zone of each of the cells of the stack; and
   wherein the vessel contains an electrolyte storage reservoir below the stack of cells, and the circulation pump is configured to convey the flow of the electrolyte from the reservoir to the stack of cells through a feed manifold.

14. The system of claim 13, wherein the positive electrode comprises a porous carbonaceous material, the halogen comprises chlorine, and the electrolyte comprises an aqueous zinc chloride electrolyte.

15. The system of claim 13, wherein the negative electrode comprises zinc and the metal comprises zinc.

16. The system of claim 13, wherein a return manifold comprises an upward flowing return manifold configured to collect the electrolyte from the cells of the stack; and the stack maintains a cell-to-cell electrical continuity and does not maintain a cell-to-cell electrolyte continuity when the flow of the electrolyte stops.

17. The system of claim 13, wherein the positive electrode and the negative electrode are arranged to maintain contact with a pool of the electrolyte when the flow of the electrolyte stops.

18. The system of claim 13, wherein the electrolyte comprises an electrolyte mixture containing (i) at least one aqueous electrolyte comprising the metal and the halogen and (ii) a halogen reactant.

19. The system of claim 18, wherein the circulation pump is located in the vessel, and the halogen reactant is supplied from a source internal to the system, and wherein an inlet of the electrolyte mixture to the reaction zone and an outlet of the electrolyte mixture from the reaction zone are each located at or above the bottom of the positive electrode within the reaction zone.

* * * * *